United States Patent [19]

Benhart

[11] Patent Number: 4,822,108

[45] Date of Patent: Apr. 18, 1989

[54] ROW STRADDLING DUAL WHEELS FOR A HARVESTER

[75] Inventor: Michael D. Benhart, Moline, Ill.

[73] Assignee: Deere & Company, Moline, Ill.

[21] Appl. No.: 610,206

[22] Filed: May 14, 1984

[51] Int. Cl.⁴ .............................................. B60B 11/00
[52] U.S. Cl. ................................ 301/36 R; 301/13 R
[58] Field of Search .................. 301/36 R, 13 R, 40 S

[56] References Cited

U.S. PATENT DOCUMENTS

| | | | |
|---|---|---|---|
| 1,665,471 | 4/1928 | Olson | 301/36 R |
| 2,014,247 | 9/1935 | Eksergian et al. | 301/36 R |
| 2,054,225 | 9/1936 | Lewis | 301/36 R |
| 2,507,285 | 5/1950 | Temple | 301/36 R |
| 2,545,130 | 3/1951 | Ash | 301/36 R |
| 4,070,066 | 1/1974 | Reppert et al. | 301/36 R |
| 4,135,765 | 1/1979 | Hardwicke | 301/36 R |
| 4,155,415 | 5/1979 | van der Lely | 301/36 R X |

FOREIGN PATENT DOCUMENTS 1802772  5/1970  Fed. Rep. of Germany .... 301/36 R

Primary Examiner—James B. Marbert
Assistant Examiner—Russell D. Stormer

[57] ABSTRACT

A row straddling dual wheel arrangement for the drive wheels of a self-propelled combine harvester comprises two highly offset dished wheels, back-to-back with central mounting flanges abutting, clamped to the combine drive axle wheel flange by conventional wheel bolts. Temporary installation in the axle flange of pilot studs and use of a retainer rod facilitate mounting and dismounting procedures in which the wheels may be handled essentially individually and then more safely.

7 Claims, 2 Drawing Sheets

ROW STRADDLING DUAL WHEELS FOR A HARVESTER

BACKGROUND OF THE INVENTION

The invention concerns dual drive wheels for an agricultural harvester and, particularly, a wheel arrangement for straddling a row of the crop to be harvested and also a method of installing the wheels on the harvester.

"Straddle duals" are gaining favor in harvesting operations and particularly in the combining of row crops. The use of widespaced dual wheels straddling a crop row avoids mashing down the crop residue in the row, reducing the likelihood of tire damage from the stubble, and enhances the stability and traction of the harvester. If duals are used, relatively narrower width tires can be used, running easily in the space between the rows.

When the crop is planted on ridges, use of straddle duals preserves the ridges during harvesting and avoids soil compaction in the rows and possible consequent yield reduction. All of the crop residue is left in condition for salvaging or harvesting if desired.

The harvester stability provided by straddle duals, with tires running on the relatively clear level ground between the rows, helps in control of front-end equipment so that, for example, wide grain heads can safely be run closer to the ground.

Existing straddle dual wheel arrangements for combine harvesters are, typically, adaptations of dual wheel designs already available for agricultural tractors and combines. They have simply been modified to provide the greater spacing between each pair of duals required to straddle the crop row with adequate clearance. Typically, a generally cylindrical spacing element is used in connecting and spacing the side-by-side wheels. While this form of connection is generally acceptable for closely spaced conventional duals in tractors or combines, the increased loading of the connecting means resulting from wider spacing of the wheels makes this method less efficient and attractive. In addition, when the so-called band configuration is used, mud build-up between the wheels soon becomes a problem.

Also known are conventional dual wheel arrangements consisting of pairs of identical dished wheels, assembled with their offset centers abutting each other. If the offset is great enough no spacers are needed between the wheels. However, in these cases, the configuration is used only for convenience in making a dual (side-by-side) wheel installation and not for establishing a predetermined wheel tread or lateral spacing. And in the resulting assembly the members of the dual wheel set are closely spaced so as to minimize transport width.

Combine harvester drive wheels and tires are typically large and heavy and awkward to maneuver. Known dual wheel designs are not inherently safe and convenient to mount.

SUMMARY OF THE INVENTION

Accordingly, it is an object of the invention to provide a straddle dual arrangement for the drive wheels of an agricultural harvester in which the individual wheels are simple in structure and potentially low in manufacturing cost, which lend themselves to an improved method of installation and which, in assembly, are structurally sound and efficient and define a straddle space of appropriate width and substantial radial depth for clearance of the crop row and for reducing the likelihood of mud build-up between the wheels.

It is a feature of the invention to provide, for each of the opposite ends of the drive axle of an agricultural harvester, a dual wheel arrangement comprising two identical wheel assemblies for mounting together, directly to a drive axle wheel mounting flange, perpendicular to the axle, and providing a predetermined separation between the wheels adequate to straddle a crop row without the need for spacers between the wheels or for additional connecting means for the wheels. This may be achieved by having each wheel rim carried by a deeply dished offset center having a central mounting flange for mating with the axle wheel mounting wheel flange. Preferably the offset of the wheel central mounting flange is such that when a pair of wheels are brought together, with their offsets opposing one another and their mounting flanges abutting, the wheel rims are spaced so that tires mounted on the rims would be spaced so as to straddle a crop row with the desired nominal clearance between the inside of the tire and the row.

According to the invention, the wheel center offset is considerably exaggerated for the specific purpose of achieving a particular axial spacing of the wheel rims when wheels are paired with the offsets abutting one another and eliminating the need for auxiliary parts such as spacers.

A feature of the invention is that identical wheel and rim assemblies can be used in pairs with potential inventory and manufacturing cost effectiveness. The structure of each wheel is simple, consisting only of a rim and dished center in welded assembly, and no additional parts other than conventional wheel studs are needed to complete the dual wheel arrangement and installation.

In addition, the wheel design offers the possibility of installation or mounting on the harvester with increased safety and convenience. This derives from the fact that each of the dual wheels has identical central mounting flanges which come together with the harvester axle mounting flange in abutting relationship. An inventive method of mounting the wheels may include the temporary installation of one or more pilot studs in the axle flange. The first or inner wheel may be guided into position on these studs and retained in proper mounting position by a retaining device engaging the guide or pilot stud and retaining the first wheel central mounting flange against the axle mounting flange. The second wheel of the dual pair may then be brought into position with its offset center opposing that of the first wheel and guided onto the pilot studs until its central mounting flange is adjacent the temporary retaining means. Regular wheel retaining bolts may now be started passing through both wheel centers and into the axle mounting flange. The temporary retaining means may then be removed from the pilot studs and the wheel retaining bolts tightened. Finally, the temporary pilot studs may be removed by unscrewing them from the axle mounting flange. Wheels may be conveniently and safely dismounted by reversal of this method. When the method outlined is followed, the wheels are handled individually and the first wheel is safely but temporarily secured while the second wheel is being maneuvered into position. The only special equipment or parts needed are the pilot studs, preferably used in pairs, and the temporary retaining device.

DESCRIPTION OF THE PREFERRED EMBODIMENT

Figure 1:
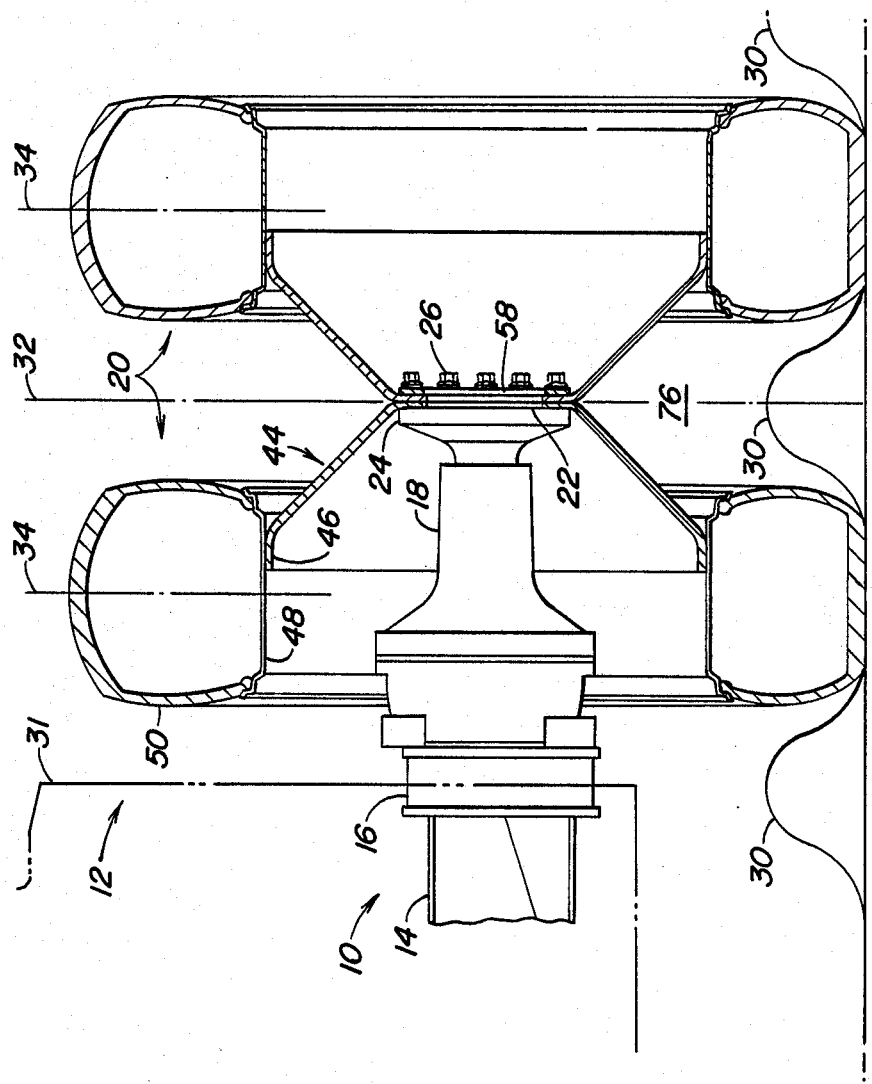
FIG. 1 is a partially sectioned view of a transverse vertical plane through the drive axle of an agricultural harvester embodying the invention and showing the dual wheel arrangement at one of the opposite ends of the axle.
Figure 3:
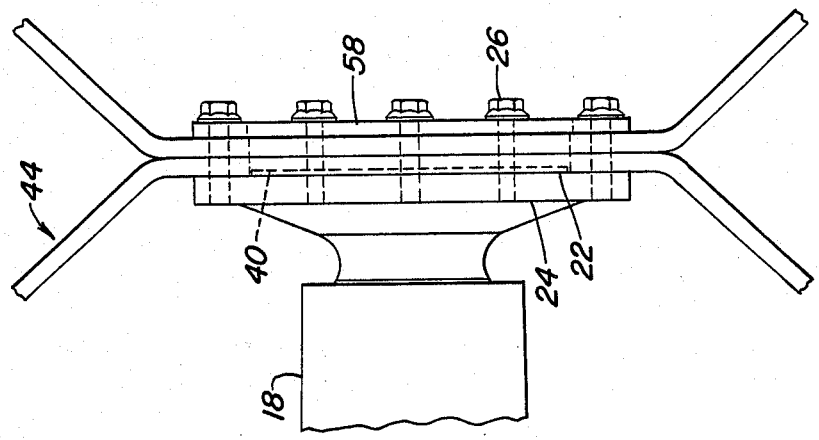
FIG. 3 is a view similar to FIG. 2 of the completed dual wheel installation.

The invention is embodied in the drive wheel arrangement of an otherwise conventional self-propelled combine. An end portion of the combine drive axle 10 and one set of dual drive wheels 12 is shown in FIG. 1.

Each end of the axle 10 includes axle housing 14, one or more spacers such as the spacers 16, and a planetary final drive assembly 18. Two identical wheel and tire assemblies 20 are secured against the mounting face 22 of axle flange 24 by wheel bolts 26.

In this exemplary embodiment, axial spacing of the dual wheels is arranged to suit harvesting of row crops planted in thirty inch rows and, in this case, on ridges 30. Thus, so that the dual wheels may straddle a row while providing at least minimum clearance for the side structure of the combine body 31, the width of spacer 16 is chosen so that the center line 32 of the duals is spaced at a convenient multiple of half row spacings from the center line of the combine—in this case seventy-five inches. Thus the duals at the opposite ends of the combine drive axle straddle pairs of rows or ridges spaced five rows apart. When the crop row spacing is relatively narrow, and particularly when the crop is planted in the ridge as here, it is convenient for each tire of the duals to run midway between the rows. Thus in this case, the center lines 34 of the dual wheel tires are spaced thirty inches apart.

Looking now in more detail at the structure involved in the dual wheel arrangement, each axle flange 24 includes a pilot boss 40 surrounded by a concentric set of threaded wheel stud holes 42. The center or disk 44 of each each wheel assembly 20 is generally conical in form with an external circumferential rim of flange 46 to which is welded, in an offset relationship, a conventional rim 48. Rim 48 accepts a conventional tire 50. At the center of the disk 44 is a wheel mounting flange 52 normal to the wheel axis and having a concentric pattern of holes 54 matching that of the axle flange 24. A central bore 56 of the wheel disk center 44 is dimensioned for piloting onto the pilot boss 40 of the axle flange 24. In final assembly, a clamping ring 58 and wheel bolts 26 clamp the pair of wheels to the axle flange 24.

Figure 2:
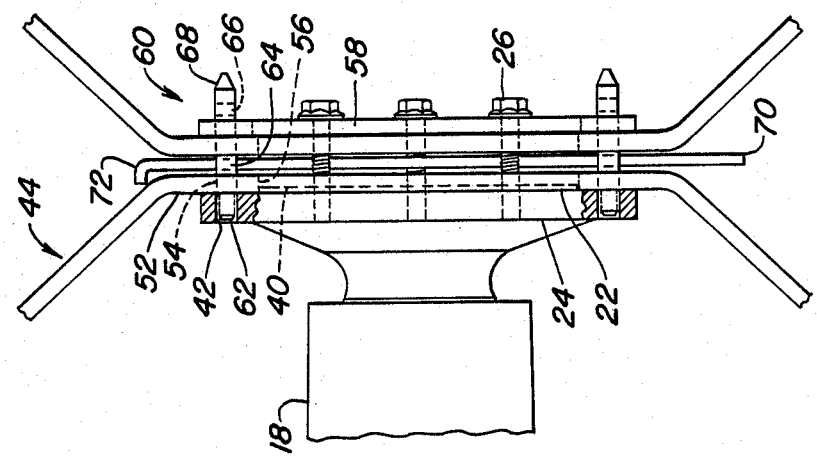
FIG. 2 is a partial enlarged view showing the harvester drive axle mounting flange with both wheels of the dual wheel set secured against the flange in an intermediate stage of installation.

As an aid in mounting the duals to the combine axle, a pilot stud 60 or preferably a pair of pilot studs is used as shown in FIG. 2. Each stud is threaded at one end 62 and has a pair of transverse holes including an intermediate retaining hole 64 and a "wrenching" hole 66 towards its chamferred end 68. Also used in mounting is an elongated retaining rod 70 which has a hooked end or handle 72.

Principle steps in mounting one set of duals 12 to one end of the combine axle 10 are as follows (see FIG. 2):

1. Two pilot studs 60 are threaded into axle flange holes 42, spaced about 180 degrees apart as indicated in FIG. 2.

2. The first wheel assembly 20 is guided onto the studs 60 with the rim and tire offset inwards. The wheel is slid inwards so that the wheel center mounting flange 52 is against the axle flange 24.

3. Retaining rod 70 is passed through the retaining holes 64 in both pilot studs 60. (Note that each retaining hole 64 provides a transverse bearing surface against which the retaining rod 70 bears to restrain the wheel.)

4. The second wheel assembly 20 is guided onto the studs 60 followed by the clamping ring 58 (this condition is indicated in FIG. 2).

5. Wheel bolts 26 are then started in the holes not occupied by the pilot studs 60 and tightened sufficiently to retain the assembly in the "snug" condition shown in FIG. 2.

6. The wheel assembly is then rotated so that the retaining rod handle 72 is downwards so that the retaining rod 70 may fall (or be pulled) out of engagement and the already inserted wheel, bolts 26 tightened.

7. The pilot studs 60 are now removed for example, by inserting a tommy bar (not shown) in the outer hole 66 to assist in rotating the studs. The remaining two wheel bolts 26 are then installed and all wheel studs tightened to recommended torque.

Figure 4:
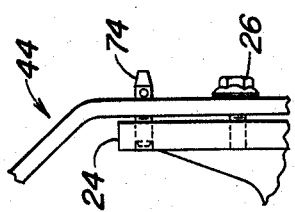
FIG. 4 is a partial view similar to FIG. 3 showing an alternative first stage in installation of the dual wheel set.

In an alternative installation procedure, which may be useful particularly for installation of larger diameter or heavier wheels, a first step is the insertion of short pilot studs 74 in the axle flange 24 (see FIG. 4). Use of these shorter studs may facilitate installation of the first of the wheel assemblies. The first wheel may then be secured temporarily by using wheel bolts 26 while the short studs 74 are removed and the longer studs 60 installed. The remainder of the procedure described above may then be followed.

Procedure for removing the dual wheels is essentially a reverse of that described above except that in some circumstances it may be convenient to remove the pilot studs 60 before finally removing the inner wheel.

As can be seen from the drawings and the above description, the structure of the wheels comprising a dual set is simple and clean in appearance, lending itself to economical manufacture. The use of identical wheel and rim assemblies for the inner and outer of the pair of duals has a potential for reducing manufacturing and inventory costs as well as errors in assembly. Spacing apart of the wheels of the pair to produce the desired straddle position derives entirely from the deep dish offset concept used for the wheel center 44. This not only simplifies the structure, in that no additional spacers or connecting members are needed (other than the simple and conventional wheel bolts 26), but produces a large outwardly tapering open space 76 to minimize the possibility of mud and trash build-up between the wheels.

An advantage of using pilot studs (60, 74) in the mounting or dismounting of the duals is that operators are required to manipulate and/or control only one wheel at a time. The inner wheel may be safely secured and restrained in its proper location (by means of retaining rod 70) while the outer wheel is being manipulated into and out of position. The combination therefore is one of simple and economical structure with good functional characteristics and convenient mounting and dismounting procedures.

I claim:

1. A method of mounting a pair of dual wheels on the outwardly facing drive axle flange of a self-propelled harvester, the axle flange having a set of threaded concentric mounting holes and both wheels having offset central mounting flanges with matching concentric sets of mounting holes, the respective offsets in the wheels making it possible to bring the central mounting flanges into contact with each other to establish a predetermined axial spacing of the wheel rims, comprising the steps of:

threading a first elongated pilot stud inwardly into a first hole of the axle flange, said stud having a generally transverse bearing surface intermediate its ends;

manipulating a first wheel with the rim offset inwards over the axle so that the holes of the wheel central mounting flange are brought into approximate register with the holes of the axle flange and so that the pilot stud enters one of the holes in the central mounting flange and so that said flange is brought up against the axle mounting flange and the transverse bearing surface of the stud is disposed outwardly of the central mounting flange;

disposing an elongated retaining rod across the outwardly facing surface of the central mounting flange and entering said rod into engagement with the transverse bearing surface so that said rod restrains the wheel with the central mounting flange closely adjacent the wheel axle flange;

manipulating the second wheel with the rim offset outwards so that the pilot stud enters one of the holes of the central mounting flange and so that the mounting holes of the flanges are brought into register and so that the central mounting flange of the second wheel is disposed axially adjacent the retaining rod;

threading at least one wheel stud through one set of aligned wheel mounting holes into a threaded hole of the axle flange and tightening said wheel stud into the axle flange until the stud tends to clamp the two wheels against the axle mounting flange;

disengaging the retaining rod from the pilot stud; and threading at least a second wheel stud through the wheel mounting holes and into a threaded hole of the axle flange and tightening said first and second wheel studs to secure the attachment of the wheels to the axle flange.

2. The method of claim 1 including threading a second elongated pilot stud into a second hole of the axle flange disposed approximately diametrically opposite the first hole and stud and wherein the transverse bearing surface of each stud is defined by a transverse through hole perpendicular to its longitudinal axis, and rotationally positioning the studs to bring said holes into axial alignment; and wherein the engagement of the retaining rod with the pilot stud includes passing the retaining rod through the transverse holes of the pilot studs so that both studs are engaged.

3. The method of claim 2 wherein the disengaging of the retaining rod includes rotating the wheels until the retaining rod is disposed approximately vertically so that it may fall from its engagement with the pilot studs.

4. The method of claim 1 and including the additional step of removing the pilot stud and threading a wheel stud into the axle flange in its place.

5. In a self-propelled agricultural harvester for harvesting crops planted in parallel rows, the lateral spacing between the centerlines of said rows defining a row width, the harvester having a transverse drive axle carrying, at each of its opposite ends, an axle flange having a set of mounting holes for attachment of a drive wheel assembly, an improved dual wheel arrangement for attachment to one of the axle flanges comprising:

means for spacing the axle flange with respect to the other axle flange at a spacing corresponding approximately to a predetermined whole number multiple of the row width; and a symmetrical dual wheel combination including: a pair of wheels of equal axial offset and diameter, each wheel including a rim for mounting a tire and having a central mounting flange, the offset of the mounting flange with respect to the rim, being sufficient to dispose the mounting flange significantly outside the axial limits of a mounted tire so that when the wheels are mounted in pairs of the axle flanges with their mounting flanges adjacent to one another and the wheel offsets disposed one towards the other and tires are mounted on the rims and the harvester is aligned with the crop rows, with the drive axle flanges each disposed over a crop row, the tires of each pair of wheels are spaced apart so as to straddle the respective crop row and the axial spacing of the centerlines of the tread of the tires of each pair is approximately equal to the row width.

6. The dual wheel arrangement of claim 5 wherein in assembly, the drive axle flange abuts one of the wheel flanges and the wheel flanges abut one another.

7. The dual wheel arrangement of claim 5 wherein each wheel comprises a formed dished disk and a wheel rim attached to the periphery of the disk.

* * * * *

Disclaimer 4,822,108.—*Michael D. Benhart*, Moline, Ill. ROW STRADDLING DUAL WHEELS FOR A HARVESTER. Patent dated Apr. 18, 1989. Disclaimer filed Aug. 28, 1989, by the assignee, Deere & Company.

Hereby enters this disclaimer to claims 5, 6, and 7 of said patent.

[*Official Gazette November 21, 1989*]